US008060450B2

(12) United States Patent
Brock, Sr.

(10) Patent No.: US 8,060,450 B2
(45) Date of Patent: Nov. 15, 2011

(54) METHOD AND SYSTEM FOR PROVIDING REAL ESTATE INFORMATION

(75) Inventor: Ronald G. Brock, Sr., Scottsdale, AZ (US)

(73) Assignee: Pierce-Eislen, Inc., Phoenix, AZ (US)

( * ) Notice: Subject to any disclaimer, the term of this patent is extended or adjusted under 35 U.S.C. 154(b) by 37 days.

(21) Appl. No.: 12/479,489

(22) Filed: Jul. 15, 2009

(65) Prior Publication Data

US 2009/0271307 A1 Oct. 29, 2009

Related U.S. Application Data

(63) Continuation of application No. 09/904,741, filed on Jul. 13, 2001, now Pat. No. 7,974,930.

(60) Provisional application No. 60/221,334, filed on Jul. 26, 2000.

(51) Int. Cl.
*G06Q 50/00* (2006.01)
(52) U.S. Cl. ........................................................ 705/313
(58) Field of Classification Search .............. 705/1, 313, 705/1.1
See application file for complete search history.

(56) References Cited

U.S. PATENT DOCUMENTS

| 4,870,576 | A |   | 9/1989  | Tornetta        |         |
|-----------|---|---|---------|-----------------|---------|
| 5,032,989 | A |   | 7/1991  | Tornetta        |         |
| 5,414,621 | A | * | 5/1995  | Hough           | 705/10  |
| 5,664,115 | A |   | 9/1997  | Fraser          |         |
| 5,680,305 | A |   | 10/1997 | Apgar, IV       |         |
| 5,794,216 | A |   | 8/1998  | Brown           |         |
| 5,857,174 | A | * | 1/1999  | Dugan           | 705/313 |
| 6,178,406 | B1 |  | 1/2001  | Cheetham et al. |         |
| 6,609,118 | B1 |  | 8/2003  | Khedkar et al.  |         |

OTHER PUBLICATIONS

Ronald W Spahr, and Mark A Sunderman. "Valuation of property surrounding a resort community." The Journal of Real Estate Research 17.1/2 (1999): 227-243 (17 pages).*
Clift, Michael. "Building Quality Assessment (BQA) for Offices". Structural Survey. 1996. vol. 14, Issue 2; p. 22 (4 pages).*

* cited by examiner

*Primary Examiner* — Elda Milef
(74) *Attorney, Agent, or Firm* — Steve P. Hassid; Silicon Edge Law Group LLP (57) ABSTRACT

An interactive, computer-implemented system for providing a comparison of at least two real estate properties is provided. The system includes a database that stores a plurality of data relating to real estate properties. The data includes at least one of address data, ownership data, size data, geographic location data and monetary value data. An interface system enables a system user to input a request for a comparison of at least a portion of the data for at least two of the real estate properties. The request includes information sufficient to identify the real estate properties to be compared. A processor uses the information to obtain a comparison of the data relating to the real estate properties. A delivery system provides to the system user a comparison of the data relating to the real estate properties.

8 Claims, 11 Drawing Sheets

PROPERTY DETAIL REPORT

THE SUMMIT
2392 W. MAIN STREET
DALLAS, TEXAS
TELEPHONE (XXX) XXX-XXXX

OWNER:
BOB SMITH RESIDENTIAL
2929 N. BROWN RD.
HOUSTON, TEXAS
TELEPHONE (XXX) XXX-XXXX
CONTACT: BOB SMITH
COMPLETION DATE: APRIL 1996

PROPERTY COMPOSITION

| UNIT TYPE | NO. OF UNITS | SIZE (SQ. FT.) PER UNIT | ACTUAL RATE TOTAL | SQ. FT. |
|---|---|---|---|---|
| ONE BEDROOM | 48 | 702 | $740 | $1.054 |
| TWO BEDROOM | 48 | 928 | $970 | $1.045 |
| TWO BEDROOM/ TWO BATH | 10 | 1109 | $1325 | $1.195 |

FIG. 11

METHOD AND SYSTEM FOR PROVIDING REAL ESTATE INFORMATION

RELATED APPLICATION

This application is a continuation of U.S. patent application Ser. No. 09/904,741, filed Jul. 13, 2001, which claims the benefit of and priority to U.S. Provisional Application Ser. No. 60/221,334, filed Jul. 26, 2000, the contents of both of which are incorporated by reference herein in their entirety.

BACKGROUND

1. Field

The present invention relates generally to a system for providing real estate information, and more particularly, to a novel system for providing real estate information, available in a very short period of time, to any computer having access to a computer communication network.

2. General Background

The real estate industry lacks ready access to current market information required to make important decisions, such as whether to acquire, dispose of develop, lend on, or invest in, a particular property. Current market data generally is provided through five principal sources: commercial real estate brokerage firms with research capabilities; public and private data gatherers engaged in compiling secondary source statistics; regional and national market research firms that provide generalized market overviews and expensive custom studies; specialized reporting services that provide specific information, such as sales activity, permit activity and the like; and appraisers.

The information provided by these sources suffers from a variety of flaws. Often, the information is too generalized, comparing irrelevant or unnecessary market factors or property features. Further, the data is generally updated only on a periodic basis, greatly reducing accuracy of measurement of current market conditions. Also, the data delivered can be subjective, reflecting agendas or viewpoints of the data supplier.

Further, data suppliers may treat the market for data as a single, homogeneous entity, rather than focusing on user segments. User segments are divisions of the commercial real estate industry that share common needs characteristics. User segments may be defined by a variety of industry needs based on, for example, loan underwriting, appraisals, management, brokerage and acquisitions. By ignoring market segment distinctions, data suppliers may fail to provide reliable and accurate information regarding a user's specific needs relating to a property or properties.

Highly specific, reliable data is principally available only through high-cost, time-consuming custom studies. Institutional investors, developers, equity sources, lenders and securities underwriters often must rely on such expensive, custom studies to obtain reliable information.

Accordingly, a need exists for a real estate market information source that provides accurate, current real estate market information that is readily accessible.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Systems and methods in accordance with various aspects of the present invention provide for the timely creation, compilation, and delivery of real estate information using a computer interface in communication with a computer network. In this regard, the present invention may be described herein in terms of functional block components, standard symbology, network diagrams, and various processing steps. It should be appreciated that such functional blocks may be realized by any number of hardware and/or software components configured to perform the specified functions. In addition, those skilled in the art will appreciate that the present invention may be practiced in any number of data communication contexts and that the various systems described herein are merely exemplary applications for various aspects of the invention. Further, it should be noted that the present invention may employ any number of conventional techniques for data transmission, signal processing and conditioning, and the like. Such general techniques that are known to those skilled in the art are not described in detail herein.

I. System Overview

Figure 1:
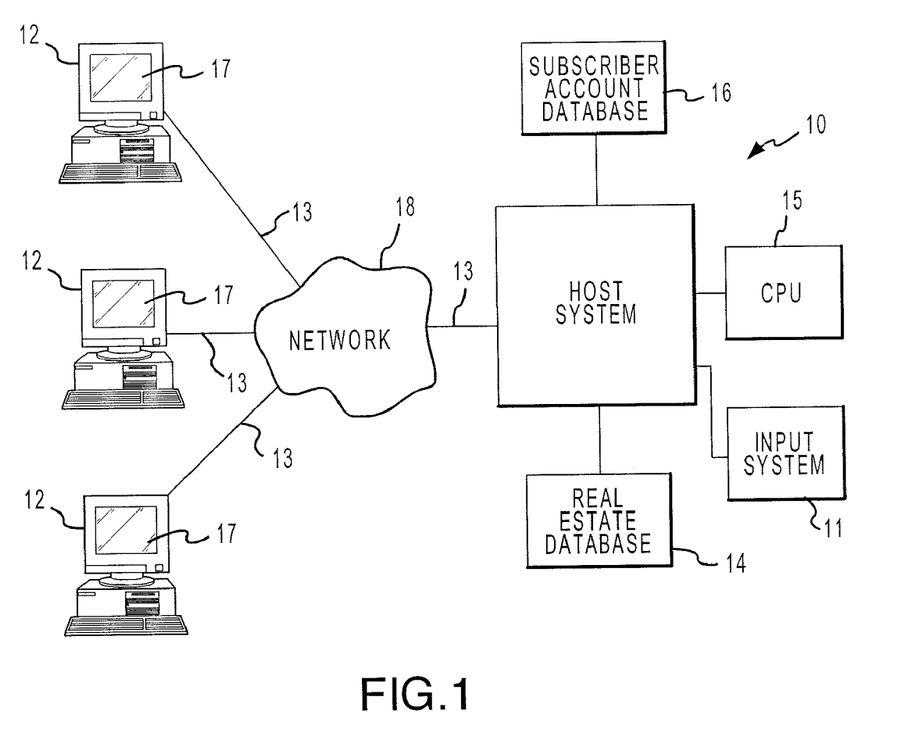
FIG. 1 is a block diagram of a system according to an exemplary embodiment of the invention.

FIG. 1 depicts an exemplary system in which the primary elements of the invention are shown. In this system, a host system 10 exchanges data with at least one interface system 12, such as remote terminal, having a display device 17, such as a computer monitor. Host system 10 exchanges data with interface system 12 through a network 18 across data transmission links 13. Data transmission on the host end utilizes a host gateway which interfaces the whole system to the network with a protocol understood by an interface system (or intermediary equipment connected thereto). For example, if the network is the Internet, transmission control protocol/Internet protocol (TCP/IP) typically is used. In FIG. 1, three interface systems 12 are illustrated. However, these numbers are only by way of example. In actual implementation, the system according to the invention utilizes a network, such as the Internet, that can be accessed by any number of users that desire real estate market information.

In an exemplary embodiment, host system 10 comprises a real estate database 14 which stores data relating to properties, such as single-family homes, apartments, and commercial properties, including industrial offices, shopping centers, mobile home parks, travel trailer resorts, mini-storage facilities and unimproved development sites, available for sale or rent. The database is used for the searching, compilation and delivering of relevant property information to users inquiring about the information. Real estate database 14 may include existing databases of information, may acquire information from other databases via an internet link, may retrieve information from compact disks, optical disks or any other storage medium, or may use any other means for acquiring data. In one embodiment of the invention, host system 10 may include an input system 11. Input system 11 is configured to permit the manual input of information into real estate database 14. Input system 11 may be used by a real estate property evaluator or other data input processor to input real estate data on a daily, weekly or monthly basis, or at any other regular interval. In this manner, real estate database 14 may be updated on a regular and frequent basis to provide to system users timely and accurate data regarding a real estate property or properties. For example, if a real estate property suffers from damage due to fire, flood, winds, vandalism or the like, a real estate property evaluator may be able to evaluate the property and have the evaluation data available to system users via host system 10 on the day or week following the damage.

Host system 10 also includes a subscriber account database 16 which stores a list of paying subscribers of the system. Input system 11 may be used to manually input into subscriber account database 16 records of new subscribers or updated account information of existing subscribers. Alternatively, new subscribers may subscribe to use the system via interface systems 12. In an exemplary embodiment, charging for the use of the system is based upon the active status of subscriber accounts stored in subscriber account database 16. It will be appreciated that any known revenue model for charging subscribers or other users of the system for information available from the system is contemplated in the present invention.

Host system further includes a central processing unit (CPU) 15 which processes inquiries from system users, interrogates the subscriber account database 16 to determine if a user is an active subscriber in good standing, searches real estate database 14 based on user inquiries, and facilitates delivery of responsive information to users. CPU 15 may instruct host system 10 to calculate or acquire any of the web pages, data or information discussed below.

In general, and as detailed further below, a system user utilizes suitable software residing on, or temporarily provided within, interface system 12 to access and request from host system 10 information relating to a particular real estate property, information comparing real estate properties, and/or information relating to real estate market conditions. The software may include, for example, a web browser, or might include stand-alone client software. The user, acting through a user interface provided by the software residing on the interface system 12, communicates with host system 10 through data transmission links 13 to request the desired information. Host system 10 processes the user's request and searches the database for the information desired. Host system 10 then transmits the requested information to the user via interface system 12 over data transmission links 13.

Having thus given an overview of the present system, the various components will now be described in detail, followed by a description of an exemplary manner of operation.

A. Interface Systems

Interface system 12 may include any convenient combination of hardware and software components configured to allow a user to communicate with host system 10, and to request and receive desired real estate information from host system 10. For example, interface system 12 may include a standard personal computer (PC) comprising a CPU, monitor, storage, keyboard, 9 mouse, and communication hardware appropriate for the data transmission links 13 (e.g., V.90 modem, network card, cable modem, etc.).

Interface system 12 also preferably includes application software configured to communicate over data transmission links 13, for example, a WWW browser such as Netscape Navigator®, Microsoft Internet Explorer®, or any other present or future communication software which operates in accordance with the HTML or HTTP protocols. As will be appreciated, interface system 12 will typically include an operating system (e.g., Windows 95/98/2000, Linux, Solaris, etc.) as well as various conventional support software and drivers typically associated with computers.

In an alternative embodiment, interface system 12 is a personal data assistant (PDA) capable of communicating with host system 10 via data transmission links 13.

B. The Network

The interface systems 12 and the host system 18 may be connected by network 18 which can be a public network, such as the Internet, an interactive television (ITV) network or an intranet. As the present invention is best deployed in the context of a large user-base, the interface system 12 preferably is in communication with the Internet. As used herein, the term Internet refers to the global, packet-switched network utilizing the TCP/IP suite of protocols. Nevertheless, the present invention may be implemented in other network contexts, including any future alternatives to the Internet, as well as other suitable internetworks based on other open or proprietary protocols.

A variety of conventional communications media and protocols may be used for data transmission links 13. Such links might include, for example, a connection to an Internet Service Provider (ISP) over the local loop as is typically used in connection with standard modem communication, cable modem, Dish networks, ISDN, Digital Subscriber Line (xDSL), or various wireless communication methods. Interface system 12 may also reside within a local area network (LAN) which interfaces to host system 10 via a leased line (T1, DS3, etc.). Such communication methods are well known in the art and are covered in a variety of texts. See, e.g., Gilbert Held, Understanding Data Communications (1996), hereby incorporated by reference.

Specific information related to the protocols, standards, and application software utilized by and in connection with the Internet will not be discussed herein. For further information regarding such details, see, for example, Dilip Naik, Internet Standards and Protocols (1998); Java 2 Complete, various authors (Sybex 1999); Deborah Ray and Eric Ray, Mastering HTML 4.0 (1997); Loshin, TCP/IP Clearly Explained (1997). All of these texts are hereby incorporated by reference.

C. The Host System

Host system 10 may include any combination of hardware, software, and networking components configured to transmit, receive and process data to and from interface system 12. In addition, host system 10 provides a suitable website or other Internet-based graphical user interface which is accessible by an interface system user. The term website as it is used herein is not meant to limit the type of documents and applications that might be used to interact with a user of an interface system. For example, a typical website might include, in addition to standard HTML documents, various forms, Java applets, JavaScript, active server pages (AS), common gateway interface scripts (CGI), extensible markup language (XML), dynamic HTML, cascading style sheets (CSS), helper applications, plug-ins and the like.

Real estate database 14 is a relational database comprising various records relating to real estate properties and real estate market conditions. In an exemplary embodiment, database 14 has a plurality of records. Each record is associated with a particular real estate property and stores information relating to that property. Such information may include ownership data, physical characteristics data, location characteristics data and monetary value data, such as purchase value data or rental rate data. By way of example, for a rental property, such as an apartment complex, ownership data may include the name and address of the property owner, the name and address of the property management company or person, and owner contact information. Physical characteristics for an apartment complex stored in real estate database 14 may include, but are not limited to: property composition, such as total number of units, number of one bedroom units, number of two bedroom/one bath units, etc.; the number of stories of the complex buildings; the roof type; construction type, such as frame and/or masonry; composition of bathroom and kitchen appliances and fixtures; type of entry, such as private, semi-private or public; whether units have balconies, patios, or attached or detached garages; a list of common area amenities, such as swimming pools, laundry facilities, covered parking and on-location manager's office; a list of recreational amenities, such as tennis and/or racquetball courts, clubhouse, and exercise facilities; a list of interior amenities, such as fireplaces, washer/dryer hookups and/or appliances, high speed Internet access, upgraded flooring, ceiling fans and fire sprinklers; security features, such as controlled access to the property and interior alarms; the services provided by the complex owner, such as air conditioning, heating, hot water; utilities responsibilities of the renter, such as electricity, sewer, trash removal and water; and site information, such as the acreage of site, development density, number of buildings and assessors parcel numbers. Photographs of the real estate properties may also be stored in real estate database 14. In addition, as discussed in more detail below, real estate database 14 may store a Physical Rating of the real estate property that can be used to compare it to other real estate properties of the same kind, i.e., single-family homes, commercial properties, apartment complexes, and the like.

Location characteristics of a real estate property stored in real estate database 14 may include, but are not limited to: major street exposure of the property; neighborhood environment, such as incidences of crime or availability of local services; freeway access proximity; special location amenities, such as proximity to parks, mountains, walking, jogging or bike trails, golf courses, etc.; proximity to employment opportunities; area employment quality, such as availability to high-paying business employment or low-paying or heavy industry employment; proximity to and quality of shopping and entertainment; access to property, such as whether there is more than one entry or whether the property is proximate to a heavy volume of traffic; household income of surrounding area, such as whether property is located in an area that is higher or lower than the metropolitan area median income; availability of public transportation; and ease of access to property. In addition, as discussed in greater detail below, real estate database 14 may store a Location Rating for a real estate property that can be used to compare it to other real estate properties of the same kind.

Monetary value characteristics of a real estate property stored in real estate database 14 may include prior sales history and current value of property. For example, if the real estate property is an apartment complex, real estate database 14 may store rental information such as actual rental rates based on the size of the apartment units, and rental history based on the size of the apartment units. In addition, as discussed in greater detail below, real estate database 14 may store Market Standard Values for a real estate property that can be used to compare it to other properties of the same kind. For example, if the real estate property is an apartment complex, real estate database 14 may store market rental rates, in addition to actual rental rates, for a more accurate comparison of apartment complex properties.

In one exemplary embodiment of the invention, host system 10 may also include a subscriber account database 16 which is a relational database that stores information regarding subscribers to the system of the present invention. In an exemplary embodiment, subscriber account database 16 has a plurality of records, each of which is associated with a subscriber. Each record may store the name, billing address, activity status and account history of the subscriber. The subscriber may subscribe based on a time schedule, such as annually or monthly, may subscribe based on the information desired, such as by subscribing only to specific property information or market-related information, or may subscribe on a one-time basis. It will be appreciated that any known revenue model for charging subscribers or other system users is contemplated in the present invention.

Host system 10 further includes a central processing unit (CPU) 15 which processes inquiries from system users, interrogates the subscriber account database 16 to determine if a user is an active subscriber in good standing, searches and compiles real estate database 14 based on user inquiries, and facilitates delivery of responsive information to users. CPU 15 may instruct host system 10 to calculate or acquire any of the web pages, data or information discussed below.

The systems of the present invention may also include a host server or other computer systems including a processor for processing digital data, a memory coupled to said processor for storing digital data, an input digitizer coupled to the processor for inputting digital data, an application program stored in the memory and accessible by said processor for directing processing of digital data by said processor, and a display coupled to the processor and memory for displaying information derived from digital data processed by said processor. The databases of the present invention may be any type of database, such as relational, hierarchical, object-oriented, and/or the like. Common database products that may be used to implement real estate database 14 and subscriber database 16 include DB2 by IBM (White Plains, N.Y.), any of the database products available from Oracle Corporation (Redwood Shores, Calif.), Microsoft Access by Microsoft Corporation (Redmond, Wash.), or any other database product. The databases may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like.

II. Physical Rating

Figure 2:
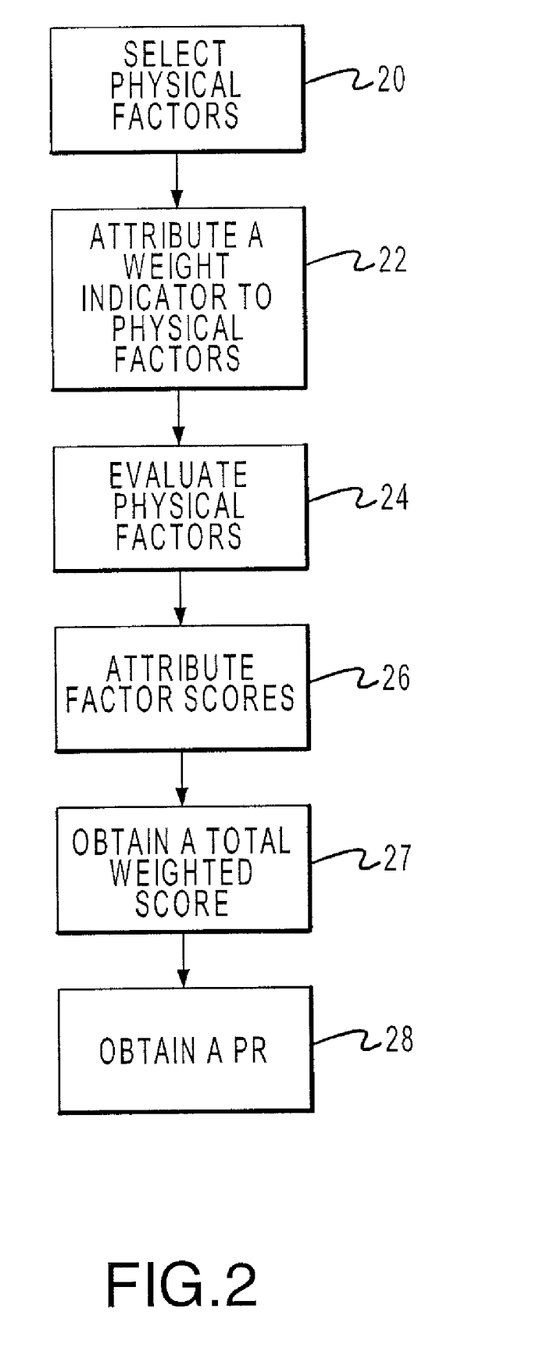
FIG. 2 illustrates a process for calculating a physical quality rating of a real estate property according to an embodiment of the invention.

In an exemplary embodiment, the system of the present invention may also calculate and provide a Physical Rating (PR) of a real estate property that can be used to compare the physical characteristics of the property to those of other real estate properties of the same kind, i.e., single-family homes, commercial properties, apartment complexes, and the like. Alternatively, the PR may be calculated manually or by another processing device and stored in real estate database 14. The PR is obtained from a statistical scoring model that places relative values on physical characteristics of a subject property. FIG. 2 illustrates a process according to one embodiment of the invention for calculating a PR for a subject real estate property. A series of physical factors generally associated with real estate properties of the type similar to that of the subject real estate property are selected (step 20). The factors are then weighted according to relative importance by attributing to each physical factor a weight indicator, which has a numerical representation (step 22). Each of the physical factors is then evaluated for the subject property (step 24) and is given a factor score (step 26). A total weighted score is then calculated based on the factor scores and the weight indicators for each physical factor (step 27). The PR is then calculated based on the total weighted score and a sum of the weight indicators (step 28).

Figure 3:
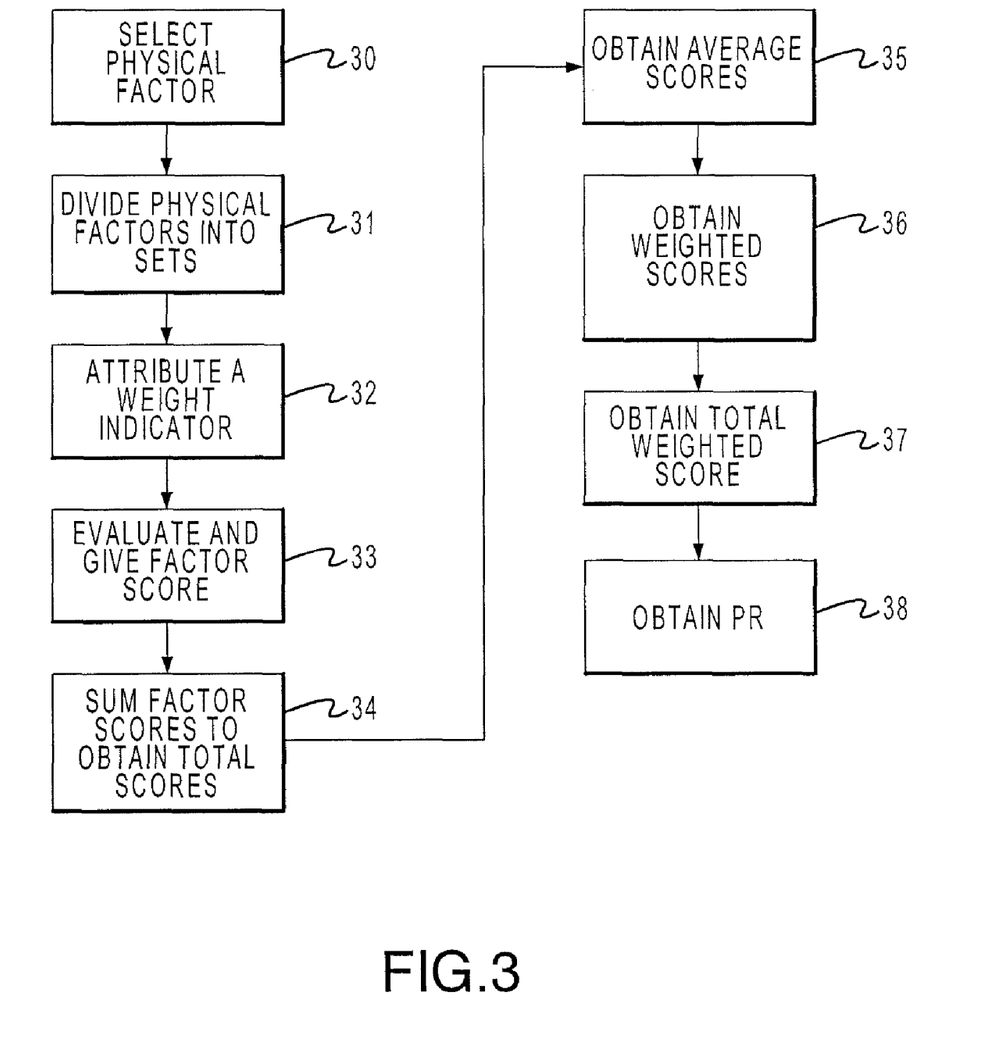
FIG. 3 illustrates a process for calculating a physical quality rating of a real estate property according to another embodiment of the invention.

In particular, in one embodiment of the present invention as illustrated in FIG. 3, the PR for a subject property may be calculated as follows. A plurality of physical factors generally associated with real estate properties of the type similar to that of the subject real estate property are selected (step 30). If the subject property is an apartment complex, for example, the following physical factors may be selected for evaluation: the extent of architectural interest; construction quality; the existence and type of balconies or patios; the entry type; the existence of interior amenities, such as fireplaces and washers and dryers; unit mix, i.e., the unit types available, the unit sizes and the proportion of unit types; the availability and types of parking; the availability and types of recreational amenities; the roof type; the number of stories; the development density; and the availability and type of security. It will be appreciated that any other suitable physical factors may also be selected for evaluation. The physical factors are then divided into sets according to similar importance and desirability (step 31). For example, the above physical factors may be divided into two sets. The first set may comprise the extent of architectural interest; construction quality; the existence and type of balconies or patios; the entry type; the existence of interior amenities, such as fireplaces and washers and dryers; unit mix, i.e., the unit types available, the unit sizes and the proportion of unit types; the availability and types of parking; and the availability and types of recreational amenities. The second set may comprise the roof type; the number of stories; the development density; and the availability and type of security. The sets of physical factors may then be attributed a weight indicator depending on relative importance and desirability (set 32). For example, each physical factor of the first set may be attributed a weight indicator of 2 and each physical factor of the second set may be attributed a weight indicator of one.

Each physical factor is then evaluated manually by a human evaluator and is given a factor score based on a graded scale, for example, from a scale of 0 to 10, 0 to 100, or the like (step 33). The factor scores for each set are then summed to obtain a total score for each set (step 34). The total scores for each set are then divided by the number of physical factors in the respective sets to obtain an average score for each set (step 35). For example, the total score for the first set may be divided by 8 and the total score for the second set may be divided by 4. The average score for each set is then multiplied by the weight indicator of the respective set to obtain a weighted score for each set (step 36). For example, using the above example for weighted indicators, the average score of the first set may be multiplied by two and the average score for the second set may be multiplied by one. The weighted scores are then added to obtain a graded index, referred to herein as a total weighted score (step 37). The total weighted score is then divided by the sum of the weight indicators to obtain the PR (step 38).

Figure 4:
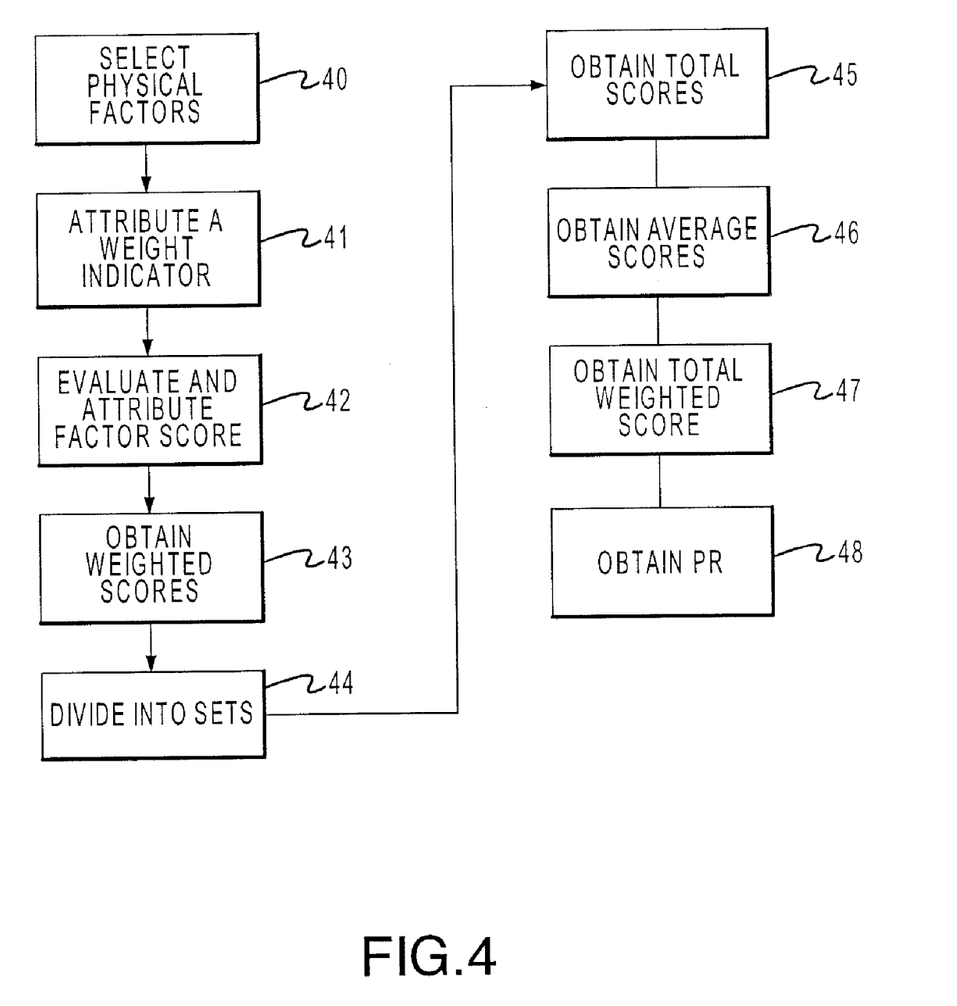
FIG. 4 illustrates a process for calculating a physical quality rating of a real estate property according to another embodiment of the invention.

It will be appreciated that the steps of the process illustrated in FIG. 3 may be modified or reordered while still calculating the PR of the present invention. For example, in another embodiment of the present invention, as illustrated in FIG. 4, a PR for a subject property may be calculated as follows: A plurality of physical factors generally associated with real estate properties of the type similar to that of the subject real estate property are selected (step 40). Each physical factor is attributed a weight indicator based on importance and desirability of the physical factor (step 41). Each physical factor is then evaluated and given a factor score (step 42). Each factor score for each physical factor is multiplied by the weight indicator for that physical factor to obtain a weighted score for each physical factor (step 43). The physical factors may then be divided into sets according to weight indicators, that is, each set will comprise physical factors to which have been attributed the same weight indicators (step 44). Accordingly, each set will be represented by a weight indicator of the physical factors within that set. The weighted scores for the physical factors in a set are then added to obtain a total score for each set (step 45). The total scores for each set are then divided by the number of physical factors in the sets to obtain an average score for each set (step 46). The average scores are added together to obtain a total weighted score (step 47). The total weighted score is then divided by the sum of the weight indicators of each set to obtain the PR of the subject property (step 48).

The process shown FIG. 3 will now be illustrated by way of example. If the subject property is an apartment complex, an evaluator may give each of the following physical factors the following factor scores:

|  | Factor Score |
|---|---|
| Physical Factor in Set 1 | |
| Architectural Interest | 8 |
| Construction Quality | 7 |
| Balconies/Patio | 6 |
| Entry Type | 8 |
| Interior Amenities | 9 |
| Unit Mix | 7 |
| Parking | 5 |
| Recreational Amenities | 6 |
| Physical Factors in Set 2 | |
| Roof Type | 8 |
| Number of Stories | 9 |
| Development Density | 7 |
| Security | 6 |

The physical factors are divided into two sets, the first set being attributed a weight indicator of 2 and the second set being attributed a weight indicator of 1. Accordingly, the total score for set 1 is 56 and the total score for set 2 is 30. The average score for set 1 is calculated by the equation:

Average Score=total score of set/number of physical factors in set, or Average Score=56/8=7.

The average score for set 2 is calculated similarly to obtain an Average Score of 7.5 The weighted score of set 1 is calculated by the equation:

Weighted Score=Average Score*Weight Indicator, or Weighted Score=7*2=14.

The weighted score of set 2 is calculated similarly to obtain a weighted score of 7.5.

A total weighted score is then calculated by adding the weighted scores of the sets. In this example, the total weighted score is 21.5. The PR is then calculated according to the equation:

PR=Total Weighted Score σ weight indicators, or PR=21.5/3=7.16.

This PR may then be compared to the PR of other apartment complexes to obtain a more accurate comparison of the complexes. Alternatively, the PR may then be converted to an alphabetic grade, which is then compared with the alphabetic grade of other similar type properties. For example, for PRs that may range from 0 to 10, the following alphabetic grades may be assigned:

| PR | Grade |
| --- | --- |
| 9.5-10.0 | A+ |
| 8.5-9.49 | A |
| 7.5-8.49 | A- |
| 6.5-7.49 | B+ |
| 5.5-6.49 | B |
| 4.5-5.49 | B- |
| 3.5-4.49 | C+ |
| 2.5-3.49 | C |
| 1.5-2.49 | C- |
| 0-1.49 | D |

In this manner, the physical characteristics of properties can easily and quickly be compared by an easy to understand rating indicator.

Location Rating

The system of the present invention may also calculate and provide a Location Rating (LR) of a real estate property that can be used to compare the location characteristics of the property to those of other real estate properties of the same kind, i.e., single-family homes, commercial properties, apartment complexes, and the like. The LR is obtained from a statistical scoring model, mathematically similar to that used to calculate the PR of the property, which places relative values on location characteristics of a subject property.

Figure 5:
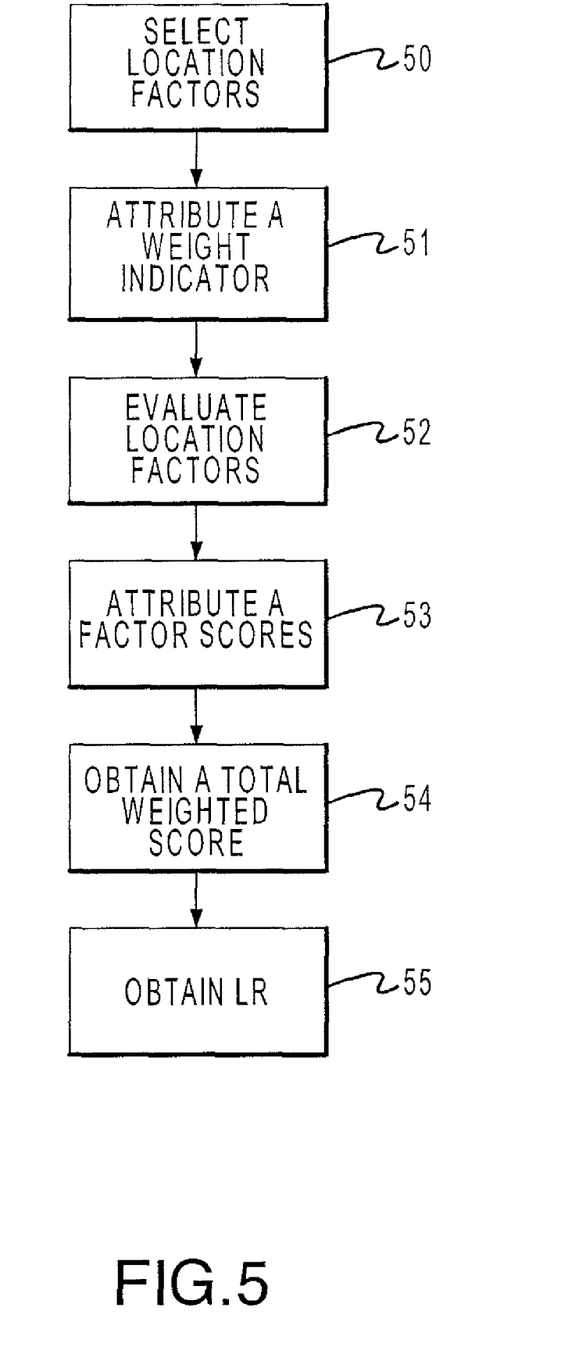
FIG. 5 illustrates a process for calculating a location quality rating of a real estate property according to an embodiment of the invention.

FIG. 5 illustrates a process according to one embodiment of the invention for calculating an LR for a subject real estate property. A series of location factors generally associated with real estate properties of the type similar to that of the subject real estate property are selected (step 50). The factors are then weighted according to relative importance by attributing to each location factor a weight indicator, which has a numerical representation (step 51). Each of the location factors is then evaluated for the subject property (step 52) and is given a factor score (step 53). A total weighted score is then calculated based on the factor scores and the weight indicators for each physical factor (step 54). The LR is then calculated based on the total weighted score and a sum of the weight indicators (step 55). The LR may be calculated by host system 10, or, alternatively, manually or by another processing device, and subsequently stored in real estate database 14.

Figure 6:
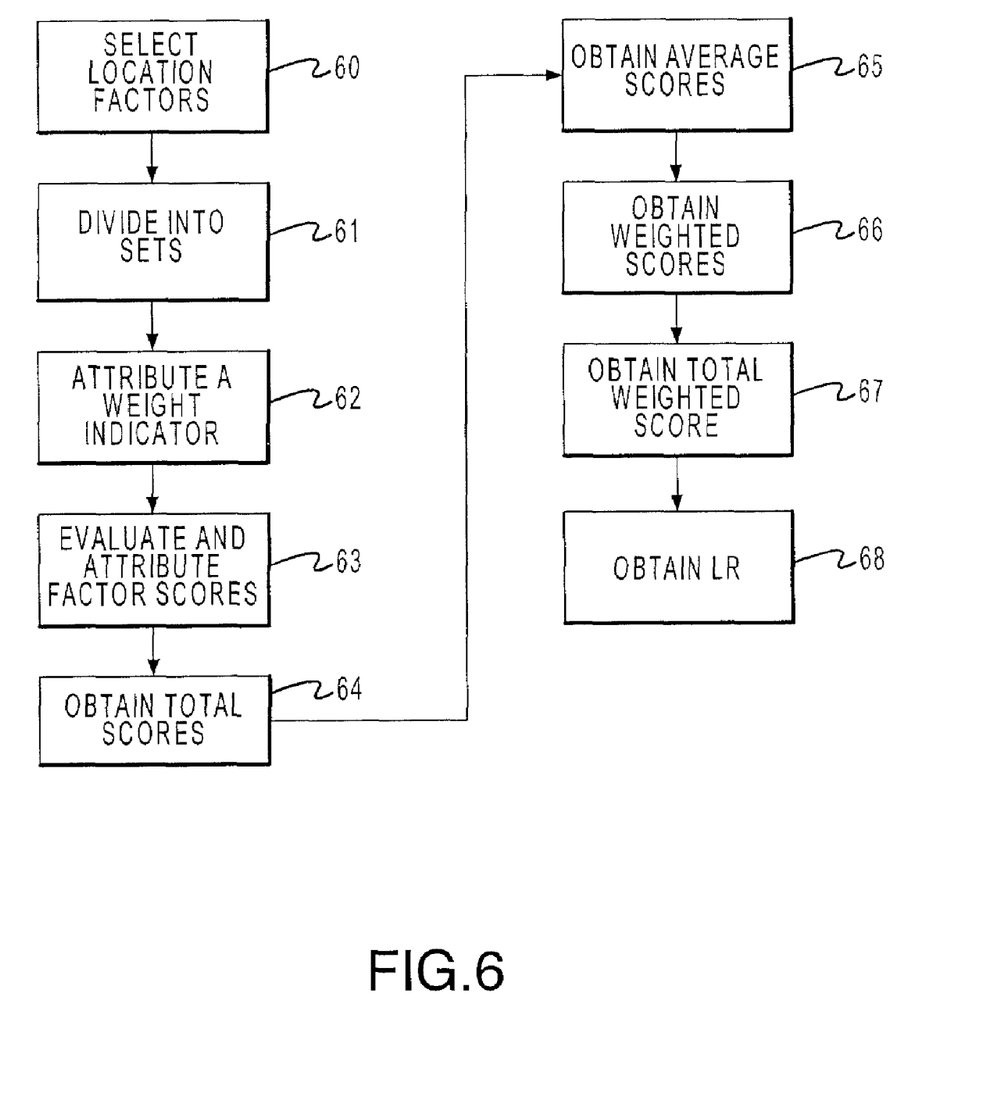
FIG. 6 illustrates a process for calculating a location quality rating of a real estate property according to another embodiment of the invention.

In particular, in one embodiment of the present invention as illustrated in FIG. 6, the LR for a subject property may be calculated as follows. A plurality of location factors generally associated with real estate properties of the type similar to that of the subject real estate property are selected (step 60). For example, the following location factors may be selected for evaluation: major street exposure, neighborhood environment; freeway access proximity; special location amenities; employment proximity; area employment quality; shopping and entertainment proximity; property access; household income of surrounding area; public transportation availability; shopping and entertainment quality; and area access rating. It will be appreciated that any other suitable location factors may also be selected for evaluation. The location factors are then divided into sets according to similar importance and desirability (step 61). For example, the above location factors may be divided into three sets. The first set may comprise major street exposure, neighborhood environment, freeway access proximity, special location amenities, employment proximity, and area employment quality. The second set may comprise shopping and entertainment proximity, and property access. The third set may comprise household income of surrounding area, public transportation availability, shopping and entertainment quality and area access. The sets of location factors may then be attributed a weight indicator depending on relative importance and desirability (step 62). For example, each location factor of the first set may be attributed a weight indicator of 3, each location factor of the second set may be attributed a weight indicator of 2, and each location factor of the third set may be attributed a weight indicator of 1.

Each location factor is then evaluated manually by a human evaluator and is given a factor score based on a graded scale, for example, from a scale of 0 to 10, 0 to 100, and the like (step 63). The factor scores for each set are then summed to obtain a total score for each set (step 64). The total scores for each set are then divided by the number of location factors in the respective sets to obtain an average score for each set (step 65). For example, the total score for the first set may be divided by 6, the total score for the second set may be divided by 3, and the total score for the third set may be divided by 4. The average score for each set is the multiplied by the weight indicator of the respective set to obtain a weighted score for each set (step 66). For example, the average score of the first set may be multiplied by 3, the average score for the second set may be multiplied by 2, and the average score for the third set may be multiplied by 1. The weighted scores are then added to obtain a total weighted score (step 67). The total weighted score is then divided by the sum of the weight indicators to obtain the LR (step 68).

Figure 7:
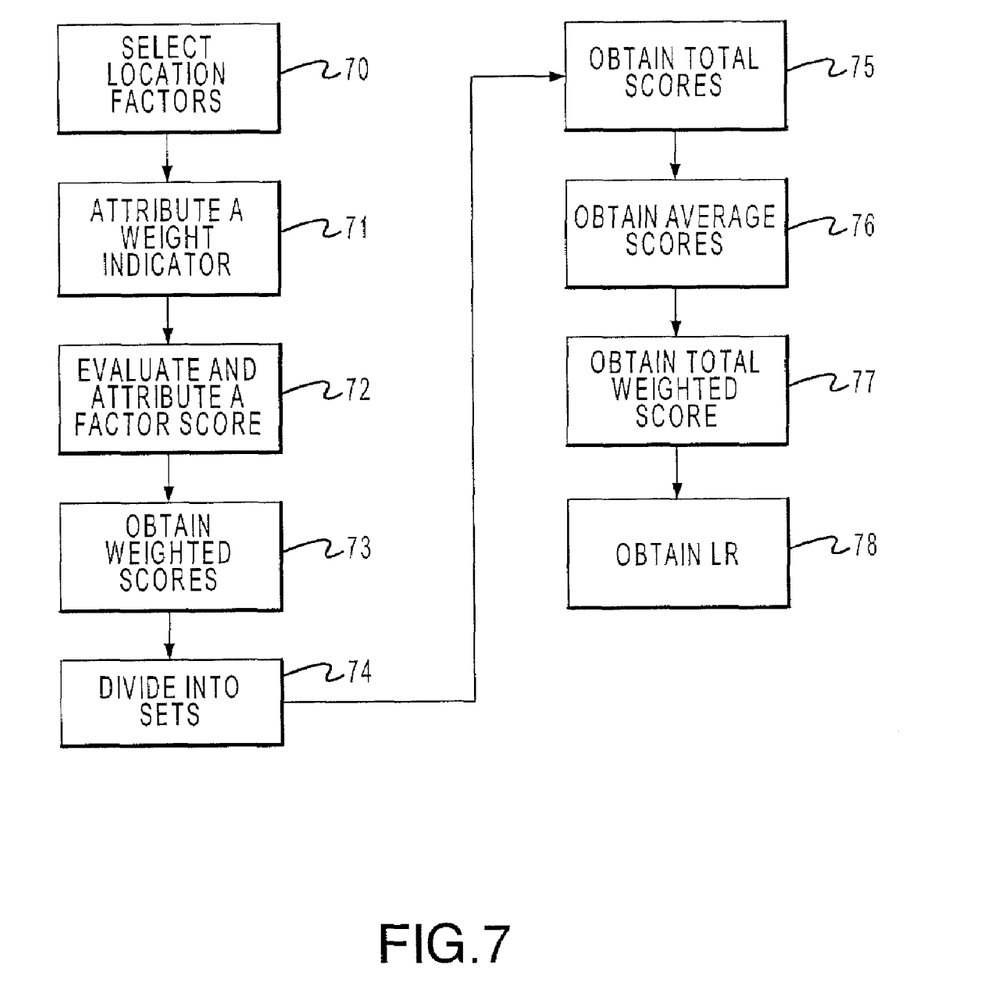
FIG. 7 illustrates a process for calculating a location quality rating of a real estate property according to another embodiment of the invention.

It will be appreciated that the steps of the process illustrated in FIG. 6 may be modified or reordered to calculate the LR of the present invention. For example, in another embodiment of the present invention, as illustrated in FIG. 7, a LR for a subject property may be calculated as follows: A plurality of location factors generally associated with real estate properties of the type similar to that of the subject real estate property are selected (step 70). Each location factor is attributed a weight indicator based on importance and desirability of the location factor (step 71). Each location factor is then evaluated and given a factor score (step 72). Each factor score for each location factor is multiplied by the weight indicator for that location factor to obtain a weighted score for each location factor (step 73). The location factors may then be divided into sets according to weight indicators, that is, each set will comprise location factors to which have been attributed the same weight indicators (step 74). Accordingly, each set will be represented by a weight indicator of the location factors within that set. The weighted scores for the location factors in a set are then added to obtain a total score for each set (step 75). The total scores for each set are then divided by the number of location factors in the sets to obtain an average score for each set (step 76). The average scores are added together to obtain a total weighted score (step 77). The total weighted score is then divided by the sum of the weight indicators of each set to obtain the LR of the subject property (step 78).

The process shown FIG. 6 will now be illustrated by way of example. An evaluator may give each of the following location factors the following factor scores:

|  | Factor Score |
|---|---|
| Location Factor in Set 1 | |
| Major Street Exposure | 5 |
| Neighborhood Environment | 7 |
| Freeway Access Proximity | 6 |
| Special Location Amenities | 2 |
| Employment Proximity | 7 |
| Area Employment Quality | 5 |
| Location Factors in Set 2 | |
| Shopping and Entertainment Proximity | 3 |
| Property Access | 7 |
| Location Factors in Set 3 | |
| Household Income | 5 |
| Public Transportation Availability | 8 |
| Shopping and Entertainment Quality | 4 |
| Area Access Rating | 7 |

The location factors are divided into three sets, the first being attributed a weight indicator of 3, the second set being attributed a weight indicator of 2, and the third set being attributed a weight indicator of 1. The total score for set 1 is 32, the total score for set 2 is 10 and the total score for set 3 is 24. The average score for set 1 is calculated by the equation:

Average Score=total score of set/number of location factors in set, or Average Score=32/6=5.33.

The average score for set 2 is calculated similarly to obtain an average score of 5 and the average score for set 3 is calculated similarly to obtain an average score of 6.

The weighted score of set 1 is calculated by the equation:

Weighted Score=Average Score*Weight Indicator, or

Weighted Score=5.33*3=15.99.

The weighted score of set 2 is calculated similarly to obtain a weighted score of 10 and the weighted score of set 3 is 6.

A total weighted score is then calculated by adding the weighted scores of the sets. In this example, the total weighted score is 31.99. The LR is then calculated according to the equation:

LR=Total Weighted Score/ weight indicators, or
LR=31.99/6=5.33.

This LR may then be compared to the LR of other properties to obtain a more accurate comparison of the properties. Alternatively, the LR of a subject property may be converted to an alphabetic grade using a conversion scale similar to that described above for conversion of a PR to an alphabetic grade.

IV. Market Monetary Values

Figure 8:
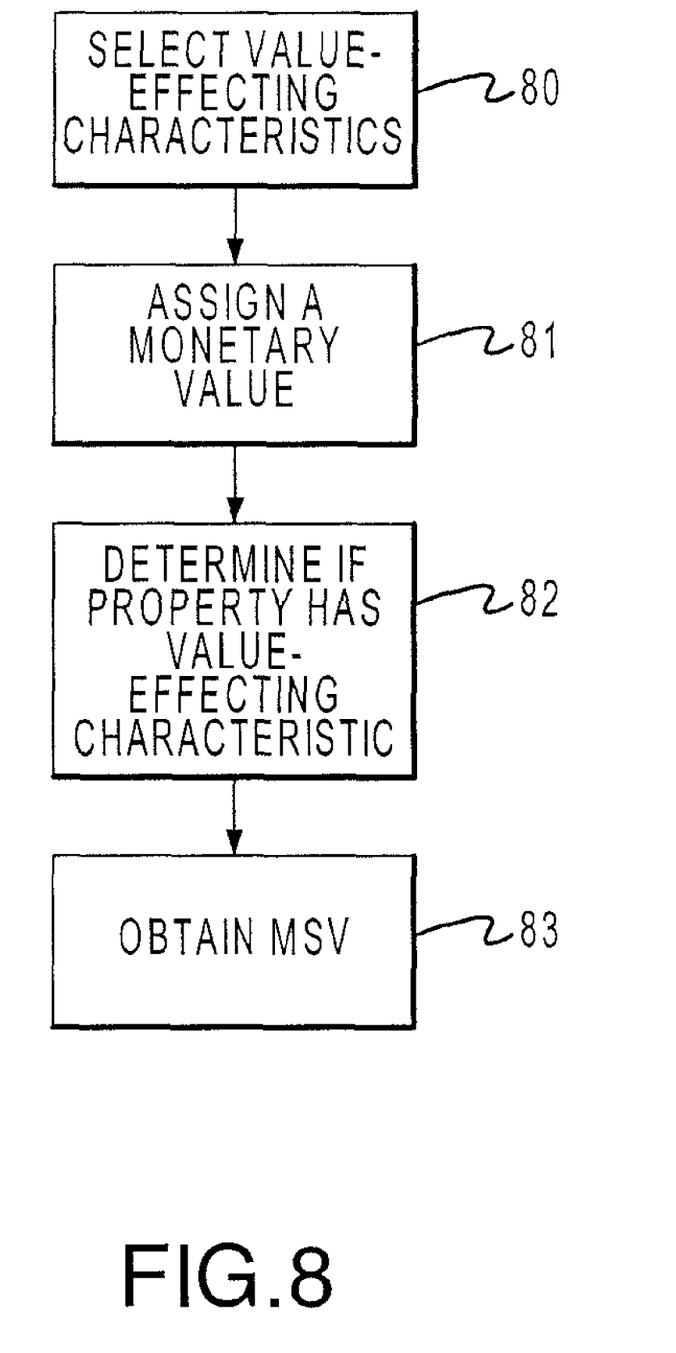
FIG. 8 illustrates a process for calculating a market standard value for a real estate property according to an embodiment of the invention.

The host system 10 of present invention may also calculate and/or store Market Standard Values (MSV) for a subject real estate property having an actual value. MSVs define an area's property value in context with other areas so that a more accurate comparison of the values of properties may be made. MSVs may represent standardized values for a property's sales price or rental value. As illustrated in FIG. 8, the process for assessing a subject property's MSV comprises selecting a plurality of value-effecting characteristics that are generally associated with real estate properties of the type similar to the subject properties (step 80). Each value-effecting characteristic is then assigned a standard monetary value, which can be either a positive or negative value (step 81). If the subject property includes the value effecting characteristic (step 82), the standard monetary value of the value-effecting characteristic is added to the actual value of the subject property to obtain the MSV of the subject property (step 83).

The process shown in FIG. 8 may be illustrated according to the following example for calculating an MSV which is a monthly rental value, that is, calculating a market standard rent, of a three-bedroom unit of an apartment complex. Value-effecting characteristics generally associated with apartments in apartment complexes may include, but are not limited to: central electric utilities metering, that is, the apartment complex pays the expense for all electric utility usage; partial electric utilities metering, such as when the apartment complex pays for air conditioning only and the residents pay the metered electric expense for heat, lights and plug-ins; in-unit washers and dryers; wood-burning or gas fireplaces; direct access to a unit garage; water charges paid by resident; sewer charges paid by resident; and trash collection charges paid by resident. The monthly standard monetary values for these characteristics may be defined based on the type of unit in the apartment complex as follows:

|  | Unit Type/Number of Bedrooms | | | |
|---|---|---|---|---|
| Characteristic | Studio | 1 | 2 | 3 |
| Central Electric Metering | <$40> | <$55> | <$80> | <$90> |
| Partial Electric Metering | <$30> | <$40> | <$55> | <$65> |
| In-Unit Washer and Dryer | <$25> | <$25> | <$25> | <$25> |
| Woodburning/Gas Fireplace | — | <$15> | <$15> | <$15> |
| Direct Access to Unit Garage | — | <$70> | <$70> | <$70> |
| Water Charges Paid by Resident | $9 | $10 | $12 | $14 |
| Sewer Charges Paid by Resident | $6 | $9 | $12 | $14 |
| Trash Collection Paid by Resident | $3 | $3 | $3 | $3 |

In this example, if the three bedroom apartment in the subject apartment complex has an actual monthly rent of $1000 and has a direct access garage, a fireplace, and a washer/dryer set and if the renter of the apartment is required to pay for water, sewer and trash collection charges, the market standard rent may be calculated as follows:

| Actual Rent | $1000 |
|---|---|
| Direct Access Garage | <$70> |
| Washer and Dryer | <$25> |
| Fireplace | <$15> |
| Water Charges Paid by Resident | $14 |
| Sewer Charges Paid by Resident | $14 |
| Trash Collection Paid by Resident | $3 |
| Market Standard Rent | $921 |

Accordingly, the calculated Market Standard Rent of $921 for this three-bedroom apartment of the subject apartment complex can be compared to the Market Standard Rent of other three bedroom apartments to more accurately assess such factors as the apartment's value and its income potential.

It will be appreciated that the above process may also be used to calculate a Market Standard Sales Price, a Market Standard Square Foot Sales Price and the like.

V. Process Flow

Figure 9:
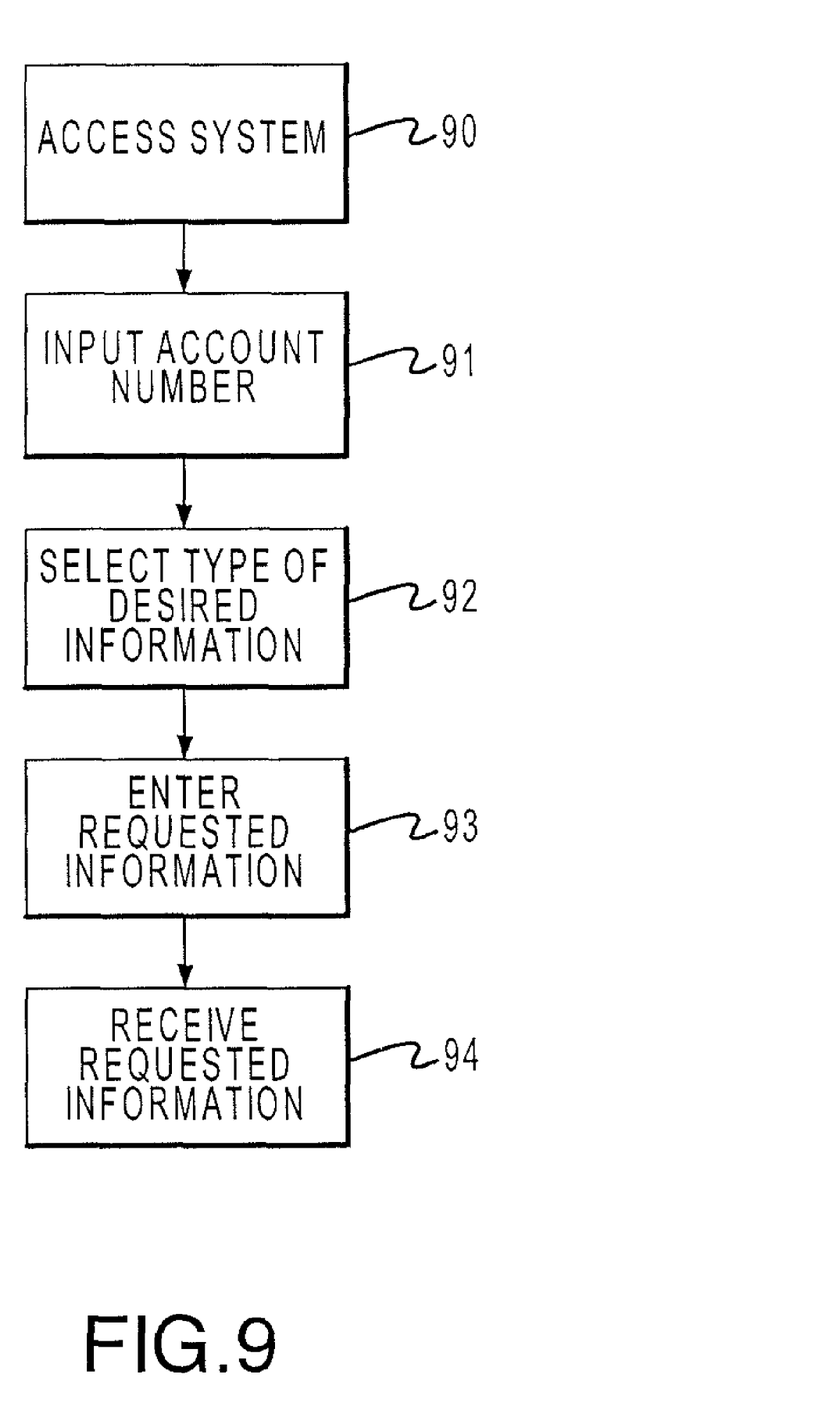
FIG. 9 illustrates a process for using the system of the present invention.

Referring now to FIG. 9, an exemplary process in accordance with an embodiment of the present invention will now be described. It should be understood that the exemplary process illustrated may include more or less steps or may be performed in the context of a larger processing scheme. Furthermore, the various flowcharts presented in the drawing figure are not to be construed as limiting the order in which the individual process steps may be performed.

As illustrated in FIG. 9, an interface system user accesses host system 10 (step 90). In this exemplary embodiment, interface system 12 and host system 10 are operatively connected to the Internet. Accordingly, the interface system user, using an interface system 12, may access a suitable website provided by host system 10. In one exemplary embodiment, the host system 45 provides via the website at least a first home page to the interface system user. At the home page, the interface system user may be provided a variety of options. For example, the interface system user may be given the option of selecting general information about a geographic location, a real estate market, or the host system owner or sponsor. If the host system requires the interface system user to be a subscriber to obtain information, the interface system user may be given the option of entering an account number or other identification number and/or password. Upon entering an account number or other identification number and/or password (step 91), the records of subscriber database 16 are searched to determine if the interface system user is an active subscriber. If the interface system user is not a subscriber, the interface system user may be denied access to the system. Alternatively, the interface system user may be given the option of becoming a subscriber. It will be appreciated that any other type of information may also be provided on the home page.

The interface system user may then be given a variety of options for selecting real estate-related information. For example, the interface system user may be given options to select the following information: information about a specific property, information about properties that fall within desired parameters, a list of properties in a geographic location, a list of properties owned by a particular person or entity, a list of competing properties, a list of new developments, a comparison of the monetary values of select properties, a comparison of PRs of select properties, a comparison of LRs of select properties, property sales information, a map illustration of properties, and information about a sales or rental market. The interface user may also be given the option to select a directory that provides information relating to service providers specializing in a real estate industry. If the interface user is interested in information about rental properties, the user may be also given the option to select vacancy history information, rental rate information, rental rate comparisons, supply changes, and the like.

Upon selecting an option (step 92), the interface system user may be prompted to enter information sufficient for the CPU 15 to locate the required information in the host database. For example, if the interface system user is interested in obtaining a comparison of the actual rental values of properties in a given geographic submarket, the interface system user will be prompted to enter the desired geographic submarket (step 93). Once all required information is entered, the CPU 15 then obtains the desired information from real estate database 14 and makes any necessary calculations. The requested information is then sent to the interface system 12 to be displayed on display device 17 (step 94).

Figure 10:
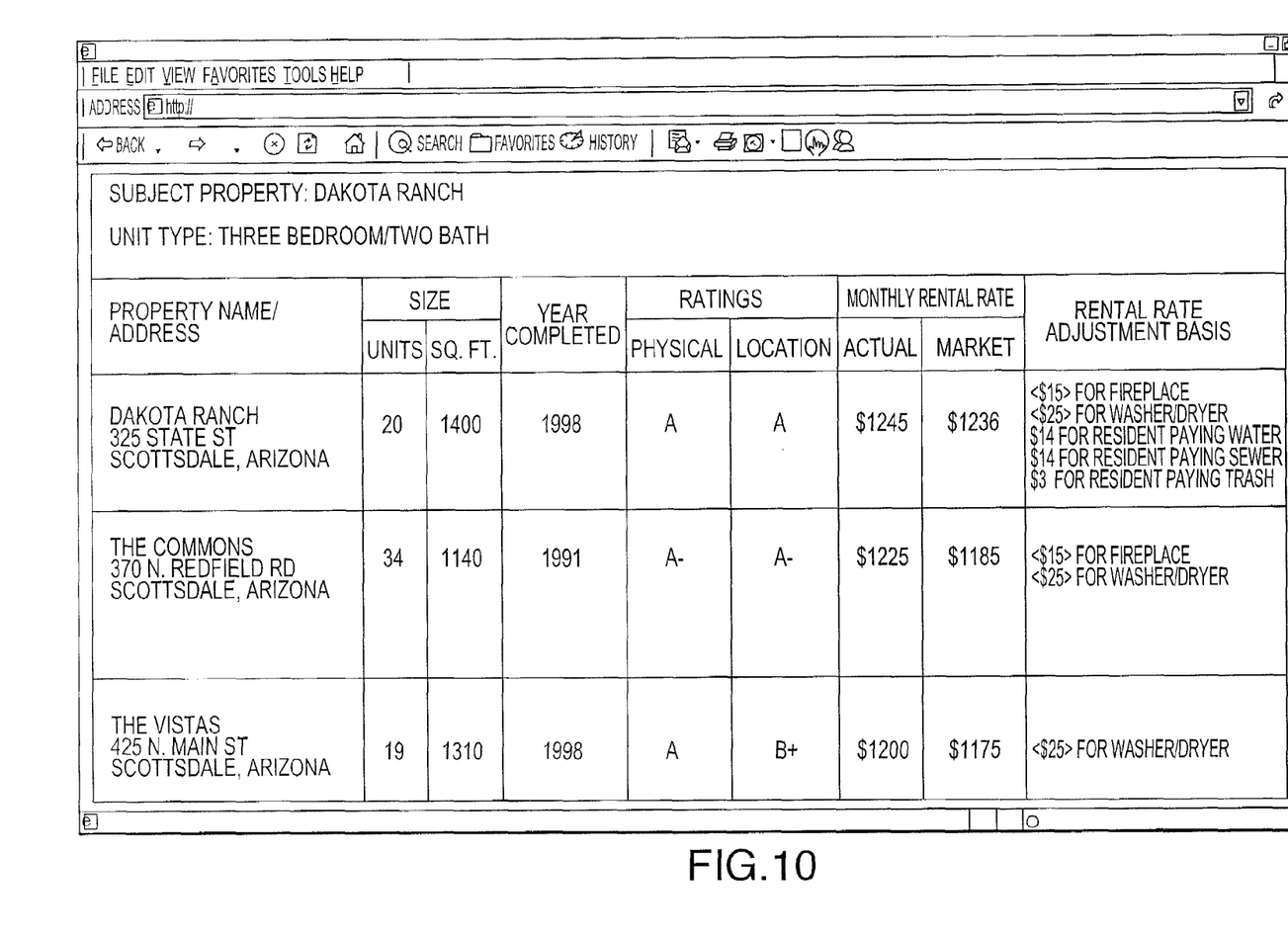
FIG. 10 is a representation of a screen display of a real estate property comparison report according to an embodiment of the invention.

FIG. 10 illustrates an example of a screen display of a real estate property comparison report that may be displayed on display device 17 of interface system 12 in response to a request from an interface system user for a comparison of monthly rental rates of three bedroom/two bath apartments of a subject apartment complex and apartment complexes within a certain radius of the subject apartment complex. The screen display may provide such information as the names of the properties in the selected geographic location, a comparison of size in square feet, a comparison of PRs and LRs for the properties, a comparison of actual monthly rental rates, and a comparison of market standard rental rates along with the basis upon which the market standard rental rates were calculated.

Figure 11:
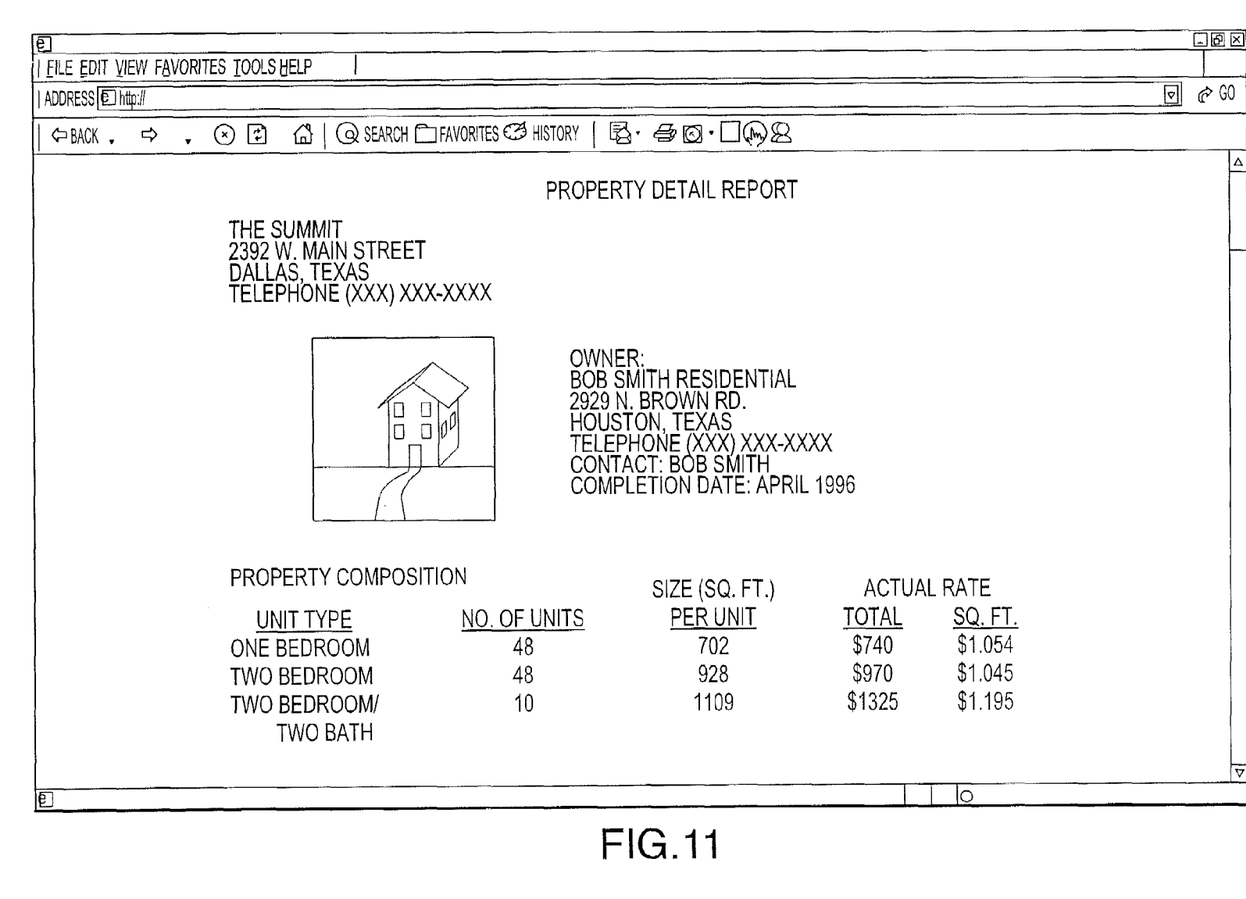
FIG. 11 is a representation of a screen display of a real estate property detail report according to an embodiment of the invention.

FIG. 11 illustrates another example of a screen display of a property detail report that may be displayed on display device 17 of interface system 12 in response to a request from an interface system user for information about a specific property. The screen display may illustrate such information as the name and address of the property, the owner of the property, and the completion date of the property. If the property is a rental property, such as a commercial building or apartment complex, the screen display may also illustrate such information as the composition of different types of units of the property, the number of the different types of units of the property, the size of the units and the actual rental rates of the units.

It will be appreciated that the above-described web pages are provided as examples of the types of information that may be provided by the system of the present invention and are not meant to limit the substance or format of information that may be provided to an interface system user.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for calculating a location rating of a subject real estate property, said method comprising:

providing an input device for selecting a plurality of location factors generally associated with real estate properties of a type similar to that of the subject real estate property, said plurality of location factors divided into sets of location factors; attributing to said each of said sets of location factors a weight indicator having a numerical representation; said input device in communication with a computer containing a processor;

for said each of said sets of location factors, the processor evaluating each of said plurality of location factors for said subject real estate property and attributing to said each of said plurality of location factors a factor score to obtain a plurality of factor scores, each of said plurality of factor scores having a numerical representation based on said evaluating;

for said each of said sets of location factors, summing said plurality of factor scores to obtain a total score;

for said each of said sets of location factors, diving said total score by said number of location factors in said each of said sets of location factors to obtain an average score;

for said each of said sets of location factors, multiplying said average score by said weight indicator to obtain a weighted score;

adding said weighted scores of said sets of location factors to obtain a total weighted score;

adding said weighted indicators of said sets of location factors to obtain a total weight indicator;

and dividing said total weighted score by said total weight indicator to obtain a location rating.

2. The method of claim 1, wherein said subject real estate property is an apartment complex.

3. The method of claim 1, wherein said subject real estate property is a single family home.

4. The method of claim 1, wherein said subject real estate property is a commercial property.

5. The method of claim 1, further comprising converting said location rating to an alphabetic score.

6. A system for providing a market standard monetary value of a subject real estate property, said system comprising:

a database storing the identity of a plurality of real estate properties, an actual monetary value for each of said plurality of real estate properties, a plurality of monetary value-effecting characteristics generally associated with real estate properties of a type similar to that of the subject real estate property, and a characteristics value for each of said plurality of monetary value-effecting characteristics, said characteristic value having one of a positive and negative value;

an interface system containing an input device in communication with a computer, the input device enabling a user to input a request for a market standard monetary value for said subject real estate property, said request comprising information sufficient to identify said subject real estate property from said plurality of real estate properties in said database; a processor which uses at least one of said plurality of monetary value-effecting characteristics and said characteristics value for said at least one of said plurality of monetary value-effecting characteristics to obtain a market standard monetary value for said subject real estate property;

and a delivery system for providing said market standard monetary value to said user;

wherein said processor is configured to select from said database each of said plurality of monetary value-effecting characteristics that are possessed by said subject real estate property and to add to said actual monetary value of said subject real estate property said characteristics value for each of said plurality of monetary value-effecting characteristics possessed by said subject real estate property.

7. The system of claim 6, wherein said actual monetary value is an actual rental rate and said market standard monetary value is a market standard rental rate.

8. A system for providing a locating rating for real estate property, said system comprising:

a database storing;

a plurality of location factors for each of a plurality of real estate properties, a weight indicator associated with each of said plurality of location factors;

a factor score associated with each of said plurality of location factors; an interface system for enabling a user to input a request for a location rating for one of said plurality of real estate properties, said request comprising information sufficient to identify said one of said plurality of real estate properties in said database;

a processor which uses said information to obtain a location rating for said one of said plurality of real estate properties; and a delivery system for providing said location rating to said user;

wherein said processor is configured to obtain said location rating for said one of said plurality of real estate properties by obtaining a total weighted score based on said factor scores associated with each of said plurality of location factors of said one of said plurality of real estate properties and said weight indicators associated with each of said plurality of location factors of said one of said plurality of real estate properties; and wherein said processor is configured to obtain said location rating by summing said weight indicators to obtain a total weight indicator and dividing said total weighted score by said total weight indicator.

* * * * *